United States Patent [19]

Palkovic

[11] Patent Number: 4,771,909
[45] Date of Patent: Sep. 20, 1988

[54] SAFETY HARNESS FOR A PRESSURIZED CONTAINER

[76] Inventor: Eric J. Palkovic, 5941 Maury Ave., Woodland Hills, Calif. 91367

[21] Appl. No.: 41,841

[22] Filed: Apr. 16, 1987

[51] Int. Cl.⁴ .............................................. B65D 51/00
[52] U.S. Cl. .................................................. 220/85 CH
[58] Field of Search ............ 220/85 CH, 3, 261, 315, 220/320, 85 P; 292/DIG. 11, 258, 288

[56] References Cited

U.S. PATENT DOCUMENTS

| | | | |
|---|---|---|---|
| 1,232,385 | 7/1917 | Palmer | 220/85 CH X |
| 1,353,050 | 9/1920 | Lambrakos | 220/85 P |
| 3,756,450 | 9/1973 | Crose, Jr. | 220/85 P |
| 3,893,725 | 7/1975 | Coulter et al. | 220/85 CH X |
| 4,022,343 | 5/1977 | Richardson et al. | 220/85 P X |

Primary Examiner—Steven M. Pollard
Attorney, Agent, or Firm—Jack C. Munro

[57] ABSTRACT

A safety harness to be used in conjunction with a pressurized container such as a swimming pool filter. The swimming pool filter includes a lid which at times can become stuck. The common procedure to remove the stuck lid is to supply pressure within the container until the lid is explosively separated from the container. The safety harness of the present invention is to be loosely mounted across the lid and fixedly attached to the side wall of the container so that when the lid is explosively blown it will be restrained in place and not caused to be propelled some spaced distance from the container.

3 Claims, 1 Drawing Sheet

SAFETY HARNESS FOR A PRESSURIZED CONTAINER

BACKGROUND OF THE INVENTION

The field of this invention relates to safety equipment and more particularly to a safety harness which is to be utilized in conjunction with a pressurized container to restrain the lid of the container when it is separated therefrom.

Pressurized containers of different types have long been known. A common form of a pressurized container is what is referred to as a swimming pool filter. The swimming pool filter is basically an enlarged cylindrical container within which is located a series of filter panels. The swimming pool water is to be conducted through this container to be cleaned.

This cylindrically shaped container utilizes a lid. A clamping band assembly is mounted between the lid and the container. When it is desired to effect cleaning of the contents of the container, it is necessary to disengage the band and remove the lid. However, it is common that over a period of time, usually months, that the lid has assumed a semi-permanent installation. In other words, the lid is "stuck" on the container.

In the past, in order to remove the lid it has been common to use some kind of a prying tool inserting such between the lid and the container. However, this prying tool dents and otherwise damages the container and/or lid as well as the seal located between the lid and the container.

To avoid the undesirableness of using a prying tool, it has been common in recent years to unhook the clamping band and then activate the pump which moves the pumped water in through the filter. As pressure builds within the filter, because the lid is not clamped onto the container, the lid will eventually be blown from the container. This type of explosive removal inherently is dangerous as this lid may be propelled some distance from the container and has been known to strike individuals located nearby thereby causing injury. Also, the lid may strike objects and cause damage to the object as well as damaging the lid.

SUMMARY OF THE INVENTION

The primary objective of the structure of the present invention is to utilize a safety harness which is to be mounted in conjunction with the lid of a conventional pool filter container and, when the lid is removed through the application of pressure within the filter, the lid will be restrained substantially in place and not be permitted to be propelled to some distant location.

The structure of the present invention comprises a safety harness which is formed of a plurality of connected together straps. The safety harness includes a main strap which includes a buckle. This main strap is to be tightly attached onto the body of the pressurized container. There are series of secondary straps connected to the main strap which are to be loosely located about the lid of the pressurized container. When the lid of the pressurized container is disengaged from the container by the application of internal pressure within the container, the secondary straps keep the lid closely spaced to the container.

Another objective of the present invention is to construct a safety harness which can be manufactured inexpensively and therefore sold to the ultimate consumer at an inexpensive price.

DETAILED DESCRIPTION OF THE SHOWN EMBODIMENT

Figure 1:
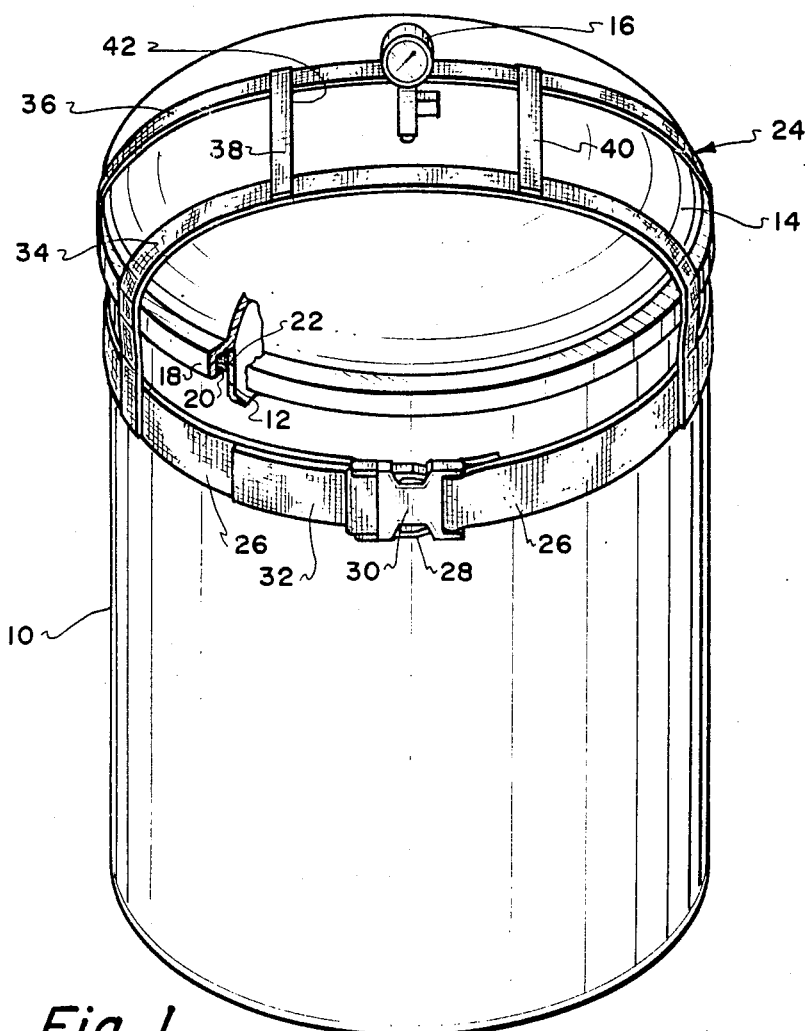
FIG. 1 is an isometric view showing a typical pressurized container in the form of a pool filter upon which has been mounted the safety harness of the present invention and pressure is about ready to be supplied to the container to effect removal of the lid from the container.
Figure 2:
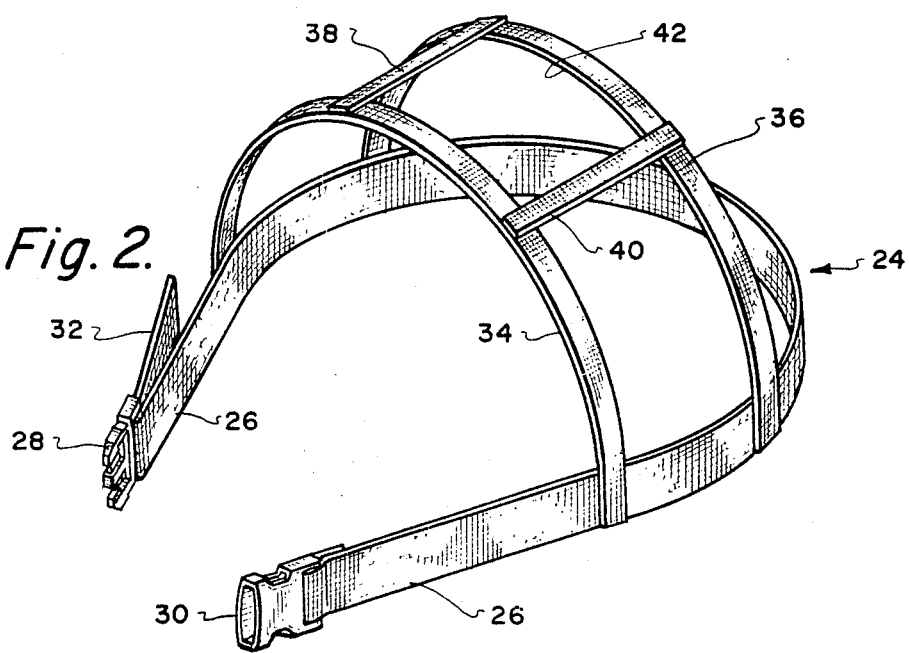
FIG. 2 is an isometric view of the safety harness of the present invention.

Referring particularly to the drawing, there is shown a canister or can type of pressurized container 10 which has an internal chamber 12. Within the internal chamber 12 there will be located some type of filtering structure (not shown). It is to be understood that although the subject matter of the present invention is designed primarily to be used in conjunction with pool filtering apparatuses, it is considered to be within the scope of this invention that it could be utilized with any pressurized container.

The container 10 terminates in an open upper end which is normally tightly closed by a lid 14. This dome-shaped lid 14 generally has mounted thereon a pressure gauge 16. The function of the gauge 16 is to visually display the amount of pressure contained within the internal chamber 12.

The open end of the lid 14 terminates in an annular flange 18. Interiorly of the annular flange 18 there is formed an annular groove 20. Within the groove 20 there is located a seal 22. There is to be mounted exteriorly of flange 18 a clamping band (not shown) which when tigthened functions to tightly press the flange 18 toward the container 10 thereby compressing the seal 22 therebetween.

When it is desired to remove the lid 14 from the container 10, the individual wishing to do the removal first disengages the clamping band (not shown) from the container 10. This individual then locates the safety harness 24 of the present invention in the position shown in FIG. 1 of the drawing. The safety harness 24 includes a main strap 26 which terminates in a pair of ends with one end being attached to male buckle section 28 and the other end being attached to female buckle 30. The buckle sections 28 and 30 are to interlock together forming a secure connected together unit. With the buckle sections 28 and 30 secured together, end 32 of the main strap 26 is to be pulled tightly thereby fixing the main strap 26 onto the container 10.

Fixedly secured to the main strap 26 are a pair of secondary straps 34 and 36. The secondary straps 34 and 36 are located substantially parallel to each other. Each end of each of the secondary straps 34 and 36 are secured to the main strap 26 and extends substantially diametrically across the lid 14 when the strap 26 is located in a substantially circular position. These straps 34 and 36 are to be loosely located across the exterior surface of the dome-shaped lid 14 as shown in FIG. 1 of the drawing. Strap 34 is located to one side of the pressure gauge 16 with the strap 36 being located on the opposite side of the pressure gauge 16.

Sewn or otherwise securely connected between the straps 34 and 36 are a pair of connecting straps 38 and 40. The area between the straps 38 and 40 and also between the straps 34 and 36 is defined as a pocket 42. Within this pocket 42 is located the pressure gauge 16.

Once the lid 14 has been explosively removed from the container 10, the propelling disconnecting of the lid 14 from the container 10 is restrained directly by the secondary straps 34 and 36 and the connecting straps 38 and 40. Since the secondary straps 34 and 36 are secured to the main strap 26, which is temporarily fixed against the container 10, the lid 14 is confined directly above the open upper end of the container 10.

What is claimed is:

1. In combination with a container, said container having an internal chamber, a lid, said lid being mounted on said container to tightly enclose said internal chamber, said lid being removable from said container, a liquid tight seal located between said lid and said container, with said lid mounted on said container said internal chamber being capable of being pressurized, the improvement comprising:

a safety harness, said safety harness including a main strap, said main strap being tightly connected to said container, said main strap being disengageable from said container; and restraining means attached to said main strap, said restraining means being loosely mounted across said lid capable of assuming a spaced distance from said lid, whereby when it is desired to remove said lid from said container and said lid is stuck said safety harness is to be mounted with said restraining means located across said lid and said main strap being tightly connected to said container, thereby upon pressurized fluid being supplied into said internal chamber and a sufficient pressure level being obtained said lid being explosively disengaged from said container and prevented from being propelled into the ambient by said safety harness.

2. The combination as defined in claim 1 wherein:
said restraining means comprising a series of secondary straps.

3. The combination as defined in claim 2 wherein:
said main strap including a buckle assembly, said buckle assembly facilitating tightening of said main strap onto said container and also facilitating disengagement of said main strap from said container.

* * * * *